United States Patent
Pratley et al.

(10) Patent No.: US 7,236,979 B2
(45) Date of Patent: Jun. 26, 2007

(54) MENU-LESS SYSTEM AND METHOD FOR INTERACTIVELY MANIPULATING AND REFORMATTING DATA ENTERED IN A TABULAR FORMAT IN A DATA PROCESSING APPLICATION

(75) Inventors: Christopher H. Pratley, Seattle, WA (US); Owen C. Braun, Seattle, WA (US); Stuart J. Stuple, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 10/180,259

(22) Filed: Jun. 26, 2002

(65) Prior Publication Data

US 2004/0002985 A1 Jan. 1, 2004

(51) Int. Cl.
*G06F 7/00* (2006.01)
(52) U.S. Cl. .............. 707/101; 715/503; 715/517; 715/906; 345/157; 345/168
(58) Field of Classification Search ............... 707/101; 715/503, 509, 906, 517; 345/157, 168
See application file for complete search history.

(56) References Cited

U.S. PATENT DOCUMENTS

| | | | | |
|---|---|---|---|---|
| 4,484,826 A | * | 11/1984 | Horn et al. ................ | 400/279 |
| 4,520,457 A | * | 5/1985 | Hagler et al. .............. | 715/503 |
| 5,115,501 A | * | 5/1992 | Kerr ........................... | 707/9 |
| 5,299,303 A | * | 3/1994 | Fukunaga .................. | 715/518 |
| 5,410,704 A | * | 4/1995 | Norden-Paul et al. ..... | 718/101 |
| 5,537,525 A | * | 7/1996 | Gotoh et al. ............... | 715/509 |
| 5,621,876 A | * | 4/1997 | Odam et al. ............... | 715/504 |
| 5,768,606 A | * | 6/1998 | Sharp ......................... | 715/509 |
| 6,134,564 A | * | 10/2000 | Listou ........................ | 715/505 |
| 6,397,143 B1 | * | 5/2002 | Peschke ..................... | 701/208 |

(Continued)

FOREIGN PATENT DOCUMENTS

JP 59128683 A * 7/1984

OTHER PUBLICATIONS

Merriam-Webster's Collegiate Dictionary 10th Edition, pp. 939, 1194-1195.*

(Continued)

*Primary Examiner*—Don Wong
*Assistant Examiner*—Michael Le
(74) *Attorney, Agent, or Firm*—Merchant & Gould P.C.; Ryan T. Grace (57) ABSTRACT

The present invention is directed at a simplified system and method for manipulating data in a data processing application. The system and method allow the user to manipulate data in a table-like manner without resorting to other data entry screens or windows to define a table-like structure. Rather, the table-like structure is defined by interactively monitoring inputs received from a user. For example, if a user enters a tab following data on a same line, the present invention will manipulate that data as two columns of information. Thus, without performing additional tasks tangential to inputting data, the user is provided with table-like features, such as wrapping text, adjusting column width, and the like. In another embodiment, the table-like structure is determined by scanning contiguous lines for lines with identical horizontal alignment in relation to a first line.

20 Claims, 6 Drawing Sheets

U.S. PATENT DOCUMENTS

| | | | | |
|---|---|---|---|---|
| 6,502,233 | B1* | 12/2002 | Vaidyanathan et al. | 717/101 |
| 2001/0005867 | A1* | 6/2001 | Zhou et al. | 710/100 |
| 2002/0062325 | A1* | 5/2002 | Berger et al. | 707/518 |
| 2003/0135480 | A1* | 7/2003 | Van Arsdale et al. | 707/1 |
| 2004/0205676 | A1* | 10/2004 | Bennett | 715/538 |

OTHER PUBLICATIONS

Microsoft Computer Dictionary Fifth Edition, p. 428.* http://www.webopedia.com, 1 page, printed Apr. 5, 2005.* http://www.techweb.com/encyclopedia, 2 pages, printed Apr. 5, 2005.* http://www.computeruser.com/resources/dictionary/, 2 pages, printed Apr. 5, 2005.* http://www.whatis.com, 2 pages, printed Apr. 5, 2005, NOTE: pseudo-table is not listed.*

Patricia Daukantas, "*Cross-tabulation Software Puts On A Web Face*"; May 15, 2000 Government Computer News; p. 30.

Edward Shaya, Jim Blackwell, Jim Gass, Vincent Kargatis, Gail Schneider and Kirk Borne; "*Formatting Journal Tables in XML at the ADC*"; Copyright 1999 Astronomical Society of the Pacific; pp. 274-277.

* cited by examiner

| FILE | EDIT | TABLE | HELP |

Table 2.

| Age Group (428) | Food Group (322) | No. of Servings (324) | Examples (326) |
|---|---|---|---|
| 4-9 | Grain Products | 5-8 | Bread, cereal, pasta |
| 10-16 | Grain Products | 6-10 | |
| Adults | Grain Products | 8-12 | |

The table below is a summary of the food groups and recommended servings for youth ages 10-16.

| Food Group (322) | No. of Servings (324) | Examples (326) |
|---|---|---|
| Grain Products | 6-10 | Bread, cereal, pasta |
| ▸etables & Fruit | 7-8 | Apples, bananas, carrots, asparagus |
| ▸etables & Fruit | | |

MENU-LESS SYSTEM AND METHOD FOR INTERACTIVELY MANIPULATING AND REFORMATTING DATA ENTERED IN A TABULAR FORMAT IN A DATA PROCESSING APPLICATION

BACKGROUND OF THE INVENTION

One of the biggest factors considered in the design and development of software applications is ease of use. Often the difference between a successful software application and an unsuccessful software application is decided by the user's experience when interacting with it. Because of this, software designers strive to simplify the user's experience.

One particularly competitive segment of the software industry is word processing software. Word processing software deals with organizing data and presenting the data to the user in a meaningful way. Typically, word processing software includes mechanisms for organizing data, such as tables, numbered lists, and the like. These mechanisms require the user to perform some action to create and define a structure for organizing the data. For example, when the user wishes to format data into columns, the user invokes actions for creating a table. Typically, the actions involve selecting a menu item associated with tables and selecting a create table sub-menu option. Once in the creation process, the user specifies the number of columns and rows for the table. When the basic structure for the table has been defined, the user may then begin to enter data into the table. However, later, if the user wants another column, the user must then invoke other actions to manipulate the existing table structure, such as selecting a format table menu selection that may pop-up another window.

Because invoking these mechanisms for organizing data takes the user's attention away from the data being input and moves it to other actions, many users may forego using these mechanisms. The user may instead organize the data using simple keystrokes, such as a tab. These tabs are then used to align the data into columns. Lines created using this technique are commonly referred to as "tabbed lines". While this technique is initially fairly convenient and straightforward for the user to use when creating columns of data, the technique fails if the user attempts to modify the structure in any significant manner. For example, if text becomes too long for one column, each of the subsequent columns in the tabbed line must be moved accordingly. The user may also need to adjust multiple rows in order to properly align the data again.

Knowing that users may attempt to create their own structure using tabs, at least one word processing software product allows a user to convert tabbed lines into a table. However, again this functionality directs the user's attention away from the original data and moves it to another window for specifying details for the conversion. All these additional actions distract slightly from the user's experience. Thus, while each of these software products provides mechanisms for manipulating data, given the competitiveness of word processing software products, each of them is less than an ideal solution to the problem.

SUMMARY OF THE INVENTION

The present invention is directed at a simplified system and method for manipulating data in a data processing application. The system and method allow the user to manipulate data in a table-like manner without resorting to other data entry screens or windows to define a table-like structure. Rather, the table-like structure is defined by interactively monitoring inputs received from a user. For example, if a user enters a tab following data on a same line, the present invention will manipulate that data as two columns of information. Thus, without performing additional tasks tangential to inputting data, the user is provided with table-like features, such as wrapping text, adjusting column widths, and the like. In another embodiment, the table-like structure is determined by scanning contiguous lines for lines having identical horizontal alignment in relation to a first line.

In one embodiment, a computer-implemented method for manipulating data in a data processing application includes detecting a special input from an input device. The method then determines whether the special input is associated with a table-like structure, such as indicating that the table-like structure is being organized (e.g., a tabbed line). Upon determining that the special input is associated with the table-like structure, the method performs a table-like function without presenting an input window for defining the table-like structure. The table-like function may include reformatting content within the table-like function, adjusting a width of a column in the table-like structure, and the like.

In one aspect, the special input includes a signal in response to a computer mouse hovering over a line of data. Then, the method scans contiguous lines to determine whether the contiguous lines are horizontally aligned line with a line of data associated with the special input. The scanning may be preformed in an upward, downward, or in both directions until an unaligned line is detected in the corresponding direction. The unaligned line has a different horizontal alignment than the line of data.

In another aspect, the method further includes creating a pseudo-table to represent the table-like structure and columns within the pseudo-table are dynamically repositioned to accommodate viewing the columns on a display.

DETAILED DESCRIPTION OF THE PREFERRED EMBODIMENT

The inventors of the present invention have appreciated that data may be manipulated interactively by monitoring the inputs received from a user. Thus, the present invention focuses on analyzing the inputs received from the user while the user is visually creating a document on a display. The document includes paragraphs, tables, and the like. In one embodiment, the present invention allows the users to create visually appealing documents using inputs associated with a standard keyboard. Furthermore, the present invention provides additional "smarts" for interactively manipulating the data using an associated data unit object. The manner in which the data is manipulated in the present invention is very different from conventional applications. For example, in some conventional data processing applications, the applications require the user to perform actions unrelated to the actual input of data (e.g., pull down a menu, hit a shortcut key that pops up an window). However, the present invention provides a more intuitive (e.g., increased ease of use) approach for data manipulation and allows the user to concentrate on the data that is entered without being distracted with additional organizational options. These and other aspects of the invention will become apparent after reading the following detailed description.

Figure 1:
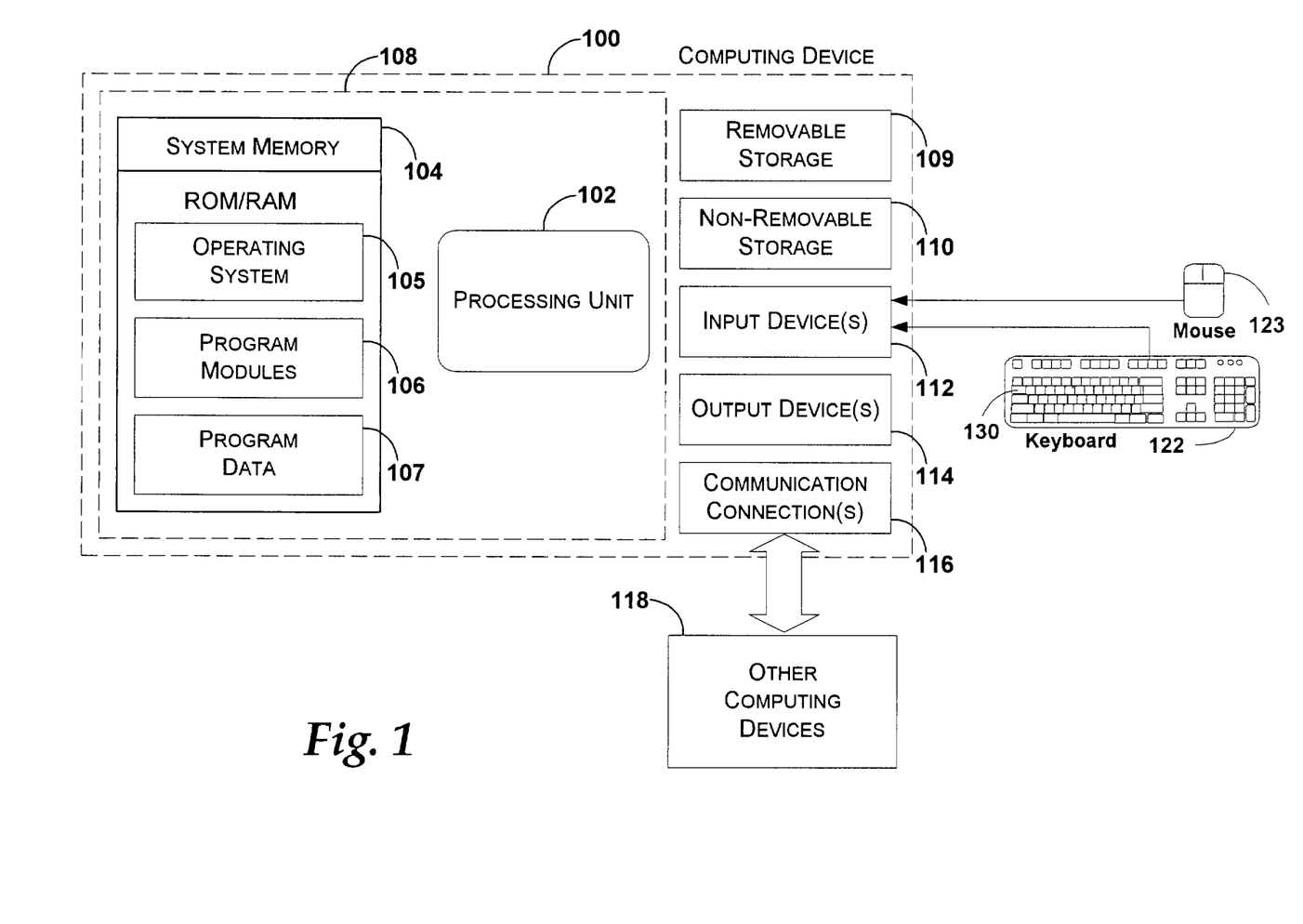
FIG. 1 illustrates an exemplary computing device that may be used in one exemplary embodiment of the present invention.

FIG. 1 illustrates an exemplary computing device that may be used in one exemplary embodiment of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
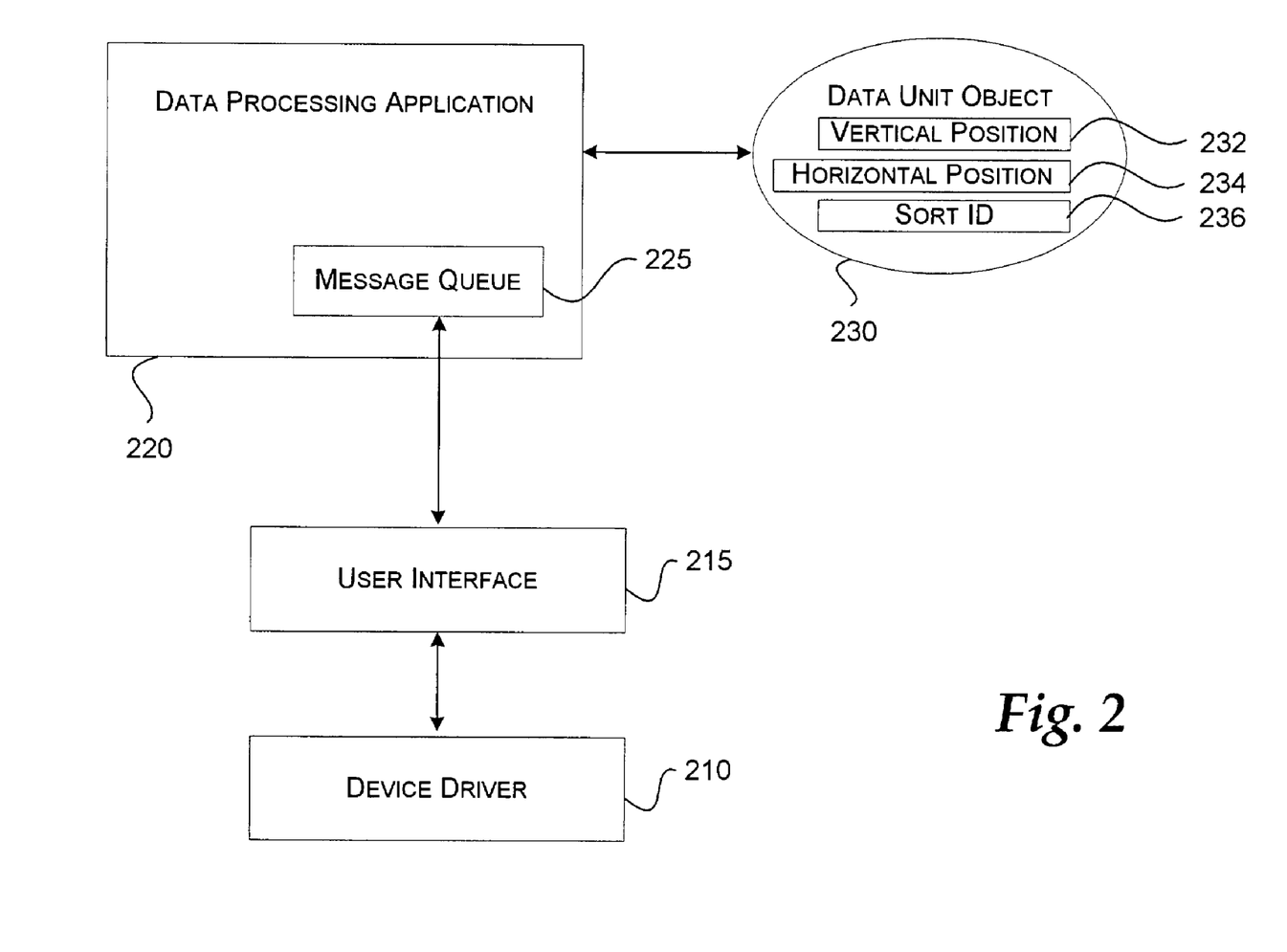
FIG. 2 is a functional block diagram illustrating components of a software environment in which the present invention may be implemented.

FIG. 2 is a functional block diagram illustrating components of a software environment in which the present invention may be implemented. Shown in FIG. 2 is a data processing application 220 that includes data organization functions as well as other functions to enable a user to manipulate and view data. In one example, the data processing application 220 may be a word processing application or the like. One function of the data processing application may be to create documents having data organized into columns of information. In this implementation, the data processing application 220 is configured to recognize data that is organized in columns of information and to manipulate this data in a table-like manner. This recognition and manipulation occurs interactively based on inputs received from the user. In one embodiment, the manipulation of the data in a table-like manner may occur in response to a unique request from the user (e.g., hovering over a line of data). In another embodiment, the manipulation of the data in a table-like manner may involve creating a pseudo-table based on user's inputs. The pseudo-table may then be manipulated in a table-like manner. Those skilled in the art will appreciate that variations to these embodiments are possible. Thus, in general, the present invention is directed at a method for interactively manipulating data in a table-like manner without using additional windows to define the table-like structure.

As illustrated in FIG. 2, the present invention may include a data unit object 230. Typically, the embodiment in which a pseudo-table is created will include the data unit object 230. The data unit object 230 may have many properties, some of which may include a font type, a font size, a vertical position 232, a horizontal position 234, and a sort identifier 236. Those skilled in the art will appreciate that many other properties may be associated with data unit object. The data processing application 220 includes mechanisms, described in greater detail below, for manipulating data associated with the data unit object 230.

Also shown in FIG. 2 is a device driver 210 associated with the input device. The device driver 210 receives signals from the input device. In the case where the device driver 210 corresponds to a keyboard 122, such as the one illustrated in FIG. 1, typical signals may indicate that a specific key has been depressed, such as tab key 130 shown in FIG. 1. In response to such a signal, the device driver 210 is typically configured to indicate the existence of the signal to an operating system, often referred to as "firing" or "raising" an "event." The operating system may then handle the event in any conventional manner. Often, in the case of input device drivers, a user interface module 215 retrieves the signal from the device driver 210. The user interface module 215 may then make the signal available to other software modules that have indicated an interest in the particular event raised.

Most software applications, such as the data processing application 220, receive user input events, including those received from a keyboard. Typically, software applications include a message queue 225 into which the user interface module 215 posts signals from input devices. In the current example, the device driver 210 receives a signal from an input device, such as the keyboard, the user interface module 215 retrieves the signal from the device driver 210 and posts the signal to message queue 225 of the data processing application 220. At that point, the data processing application 220 may handle the message in any practical way. In accordance with the present invention, the data processing application 220 handles the messages by monitoring each message and detecting when a user is visually creating a table-like structure in the document. In this way, the user's experience in manipulating data is simplified over existing software applications.

Figure 3:
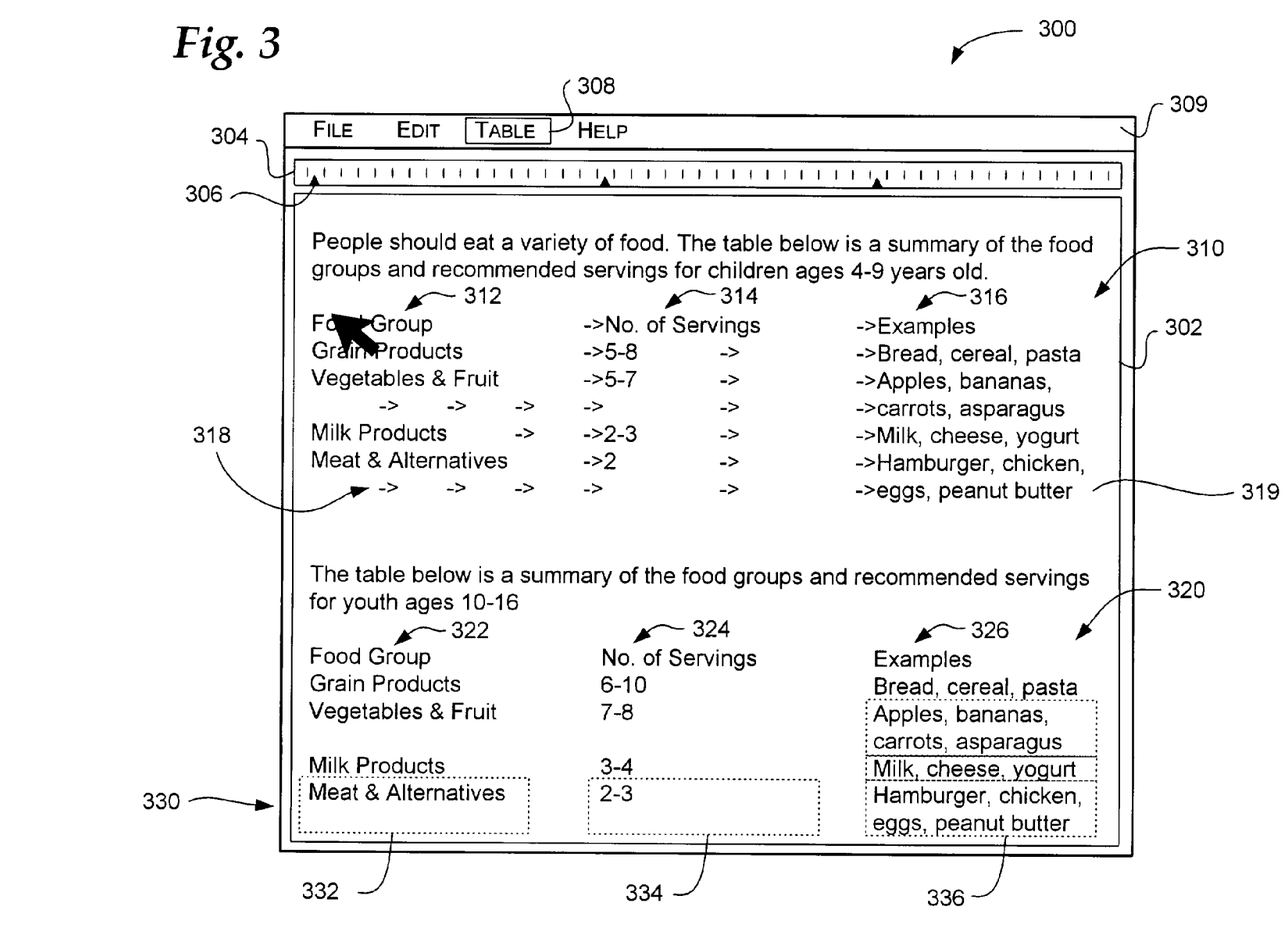
FIG. 3 is an illustrative screen shot of a user interface that may be presented by the data processing application of FIG. 2, in accordance with one implementation of the invention.
Figure 4:
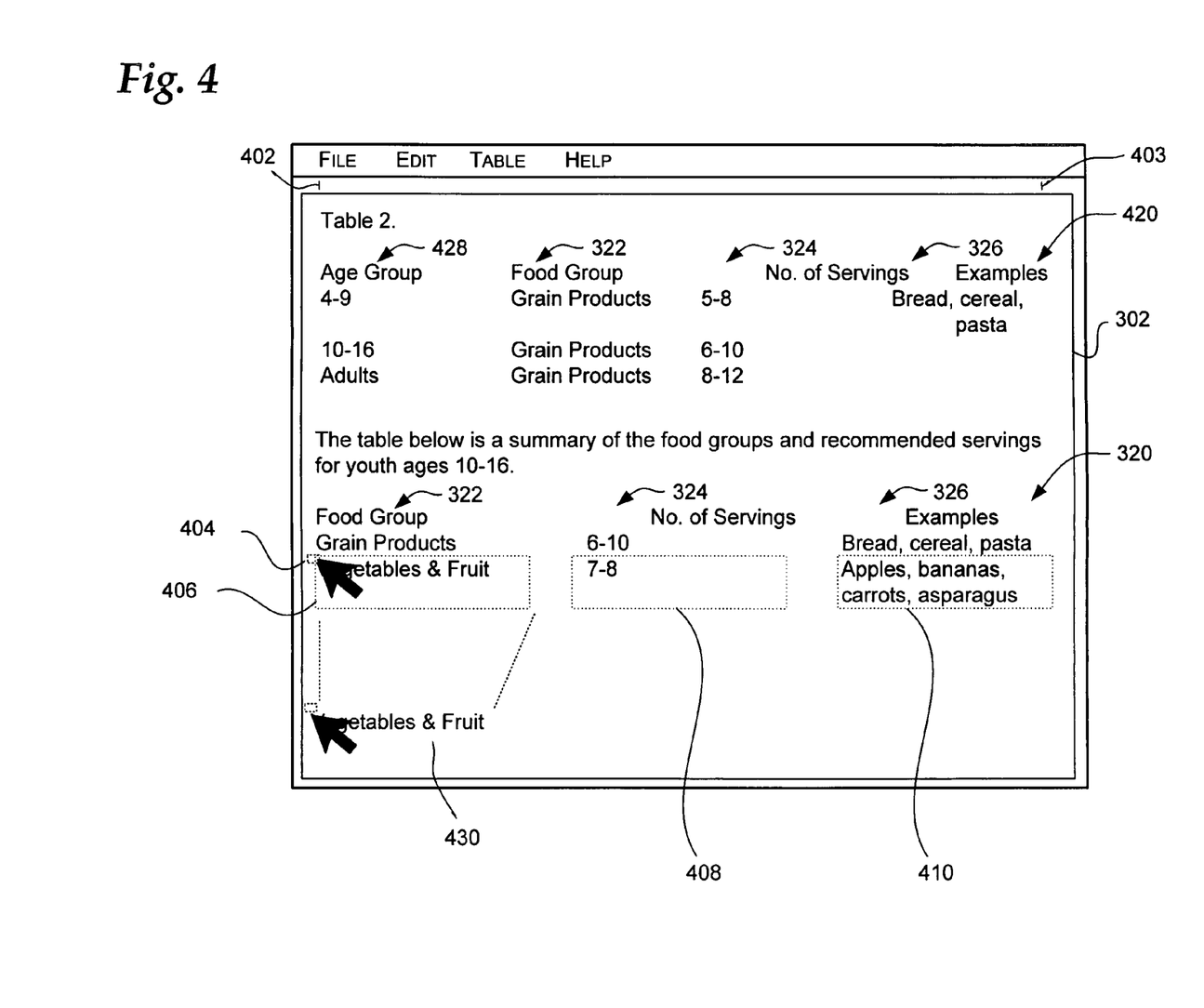
FIG. 4 is another illustrative screen shot of the user interface presented by the data processing application of FIG. 2, in accordance with one implementation of the invention, which illustrates a handle associated with a data unit.

FIGS. 3 and 4 are illustrative screen shots of a user interface that may be presented by the data processing application 220 shown in FIG. 2. Shown in FIG. 3 is a window 300, in which a document 302 appears for editing. The document 302 includes two structures, a first structure 310 and a second structure 320. The first structure is visually organized as a table 310 created using one of the conventional methods for structuring data. As such, table 310 includes three columns 312, 314, and 316. As one will note, a user created these columns by entering a tab (graphically shown using "->") (e.g., tab 318) to visually align the data on each row into three columns. However, as explained above, this conventional method for organizing data is extremely fragile. For example, on a last line 319 in table 310, several tabs 318 appear in order to align data with the third column 316. The data appearing in the third column 316 of line 319, however, is actually a continuation of data from the third column 316 in the preceding line. As one skilled in the art will appreciate, if there had been data in one of the other columns (e.g., column 312), additional manipulation of the data would have been necessary.

In other conventional systems, data processing application may provide a ruler 304. Then, in accordance with conventional data processing applications, the number of tabs 318 may be minimized by setting a tab mark (e.g., tab mark 306) on the ruler 304 to indicate where to align the data that is entered after the tab 318. However, these conventional systems still experience the limitations discussed above. Another option is for a user to explicitly create a table, such as by selecting a Table option 308 in menu bar 309. However, this technique detracts from the user's task of inputting data and forces the user to perform tasks tangential to the task of inputting data.

Even though the first structure includes tabbed lines, the present invention may manipulate the first data structure in a table-like manner according to one embodiment of the invention. Briefly, described in detail below in conjunction with FIG. 5, when a cursor (depicted as an arrow in the first line of column 312) hovers over data, contiguous lines are scanned vertically to recognize whether the contiguous lines have content that is horizontally aligned. The scanning may occur in an upward direction, a downward direction, or in both directions. Thus, for the tabbed lines shown in FIG. 3, the present invention will recognize the horizontally aligned data and will allow the lines of data to be manipulated as if the lines were within a table.

The second structure in document 302 illustrates a table-like structure (hereinafter referred to as pseudo-table 320) created in accordance with the present invention. While table 310 and pseudo-table 320 may visually appear the same when viewing on the display, the process for manipulating the underlying data is quite different. Again, pseudo-table 320 is illustrated having three columns 322, 324, and 326. Each line (e.g., line 330) has a data unit (e.g., data units 332, 334, and 336) associated with each of the three columns 322, 324, 326, respectively. Data units 332, 334, 336 are illustrated as an outlined box around the data in the corresponding column. These data units 332, 334, and 336 are created without resort to an external command, menu, or the like. Rather, as will be described in detail later in conjunction with FIG. 6, the data units 332, 334, and 336 are created interactively based on inputs received from the user via the input device. In addition, data units 332, 334, 336 allow data to be conveniently manipulated, such as wrapping data onto a new line within the same column of information.

Referring now to FIG. 4, a new column 428 is added to pseudo-table 320 shown in FIG. 3 to create pseudo-table 420. The other columns 322, 324, 326, are associated with the same type of information as shown in pseudo-table 320, but each data unit (i.e., cell) may contain different content. In one illustrative example, new column 428 is added in response to a user's insertion of a tab before the content in column 322. Briefly, when this occurs, the present invention detects the tab and recognizes that there are currently three columns on the line. Therefore, the line is divided into four columns of information. The four columns are dynamically positioned such that each column fits within designated margins 402 and 403. The dynamic positioning may evenly divide the available line length by the number of needed columns. Alternatively, dynamic positioning may add and reposition columns based on the length of the content in each column. One skilled in the art will appreciate that other dynamic repositioning techniques may likewise be applied. As will be described in detail below, this dynamic repositioning is achieved without resorting to external actions, menus, or the like. In addition, the dynamic repositioning recognizes numbered lists and repositions them accordingly.

On the lower portion of FIG. 4, a portion of pseudo-table 320 illustrated in FIG. 3 is illustrated. In this embodiment, each data unit (e.g., data unit 406) has an associated handle 404. The handle 404 appears when a cursor (designated with a large arrow) hovers over a data unit, such as data unit 406. The handle 404 allows the user to directly manipulate each data unit without using an abstract toolbar, menu, or the like. For example, if a user pulls the handle away from the data unit, the data associated with the data unit disappears and the data unit is removed. The remaining structure of the pseudo-table adjusts accordingly. In the present example, if handle 404 is pulled away, data units 408 and 410 will shift left one column. In another scenario, if the handle is interacted with in a particular way (e.g., double clicking), the content represented by the table structure and associated with the handle may be selected. For example, rather than selecting the single data unit 406, the entire "row", including data units 406, 408, and 410, may be selected. The selected content may then be manipulated using conventional methods, such as cutting, moving, copying and the like. When this is done, the selected content is manipulated, but the structure remains. When the selected content is pasted, the selection is treated as a line of text. In the example illustrated in FIG. 4, the selected content 430, "Vegetables and Fruit", is shown being pasted into the same document (i.e., document 302). Even though the tabs are used to manipulate the data into data units, the tabs need not be stored with the data in the document. By eliminating steps from the conventional methods, the invention improves the user's experience, providing the data processing application with an advantage.

Although described here in the context of a tab key on a keyboard, it will be appreciated that other input devices may work suitably well also. For instance, a pen on a touch screen may be used to provide a special input. Alternatively, the input device may be a voice recognition application and the special input may be an audible command, such as saying the word, Tab. Thus, these and other alternatives are all within the scope of the present invention.

Figure 5:
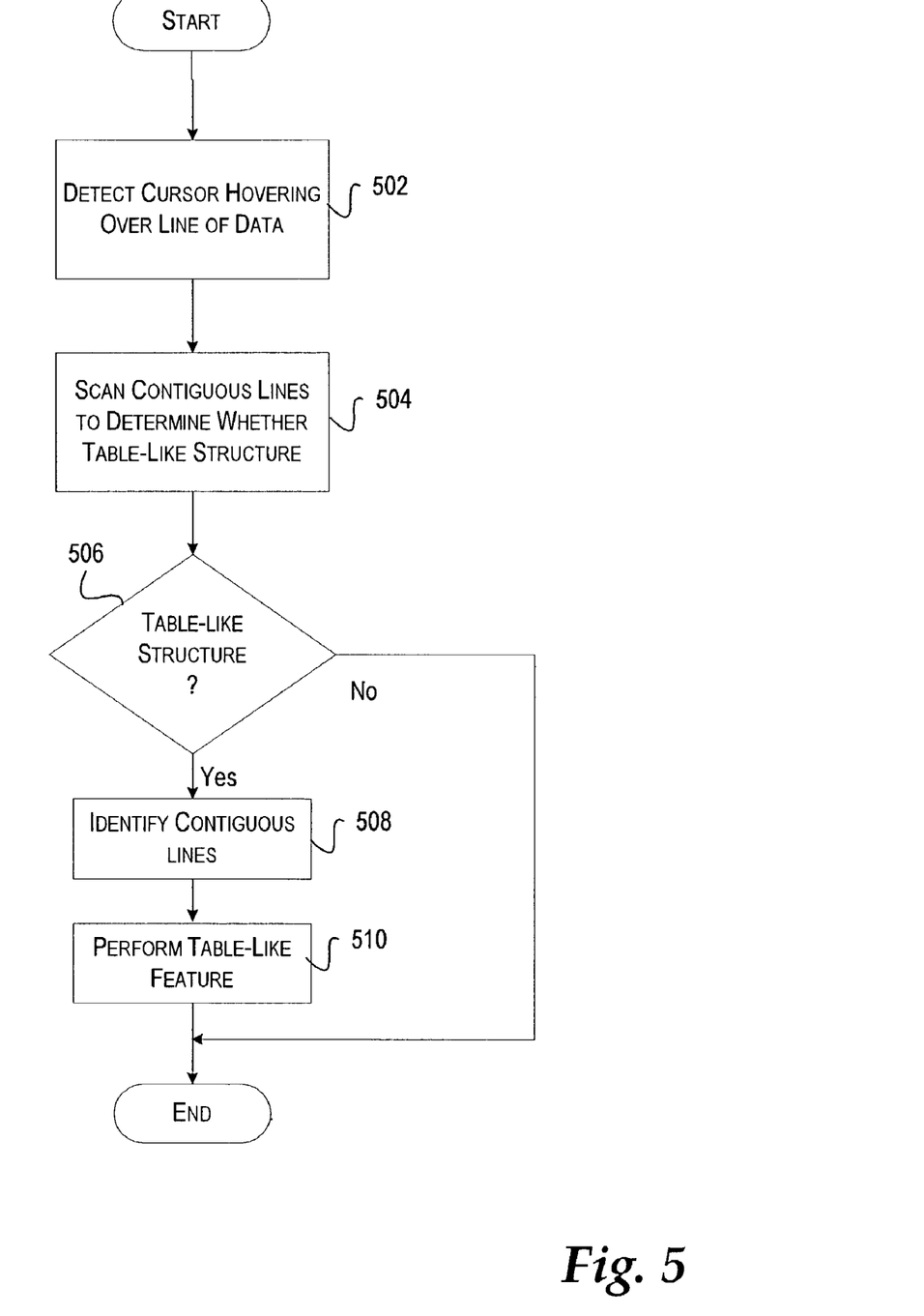
FIG. 5 is a flow diagram illustrating one embodiment for manipulating a plurality of lines of data as a unit of data.

FIG. 5 is a flow diagram illustrating one embodiment for manipulating a plurality of lines of data as a unit of data. The process begins where a data processing application is executing and handling special inputs received from a user. This flow chart illustrates the process for manipulating the plurality of lines of data when the user hovers over a line of data already written in a document. Thus, at this point, a document has already been created and includes a plurality of tabbed lines. Processing continues at block 502.

At block 502, a hover input notification is received. The hover input notification corresponds to a signal generated by an input device when a user "hovers" over data within a document. One skilled in the art will appreciate that the hover input notification is one of many signals that the data processing application handles. The handling of these other input notifications may be performed in any conventional manner, and, thus, are not described in detail herein. Processing continues at block 504.

At block 504, contiguous lines are scanned to determine whether a table-like structure exists. The scanning of these contiguous lines may be performed in a downward direction, an upward direction, or in both directions from the line at which the user is hovering (i.e., the hover line). Processing continues at decision block 506.

At decision block 506, a determination is made whether a table-like structure exists that includes the hover line. If any line that is contiguous to the hover line has content that is aligned horizontally with the hover line, the process concludes that this line and the hover line represent a table-like structure. However, if there are no contiguous lines that are aligned horizontally, the process ends. Alternatively, if at least one contiguous line is horizontally aligned with the hover line, the process continues at block 508.

At block 508, all contiguous lines that are aligned with the hover line are identified and become part of the table-like structure. The identification of the contiguous lines ends when a line occurs that has a different horizontal alignment than the hover line. Processing continues at block 510.

At block 510, the lines included in the table-like structure are manipulated according to user input, such as changing the associated horizontal position, bolding the content within the column of information, and the like. Thus, the user is allowed to manipulate the data as one unit of data without resorting to additional windows. This ease of use enhances the user's experience when creating documents and the like. In order to manipulate the data as one unit of data, the data processing application may internally convert the identified table-like structure into a pseudo-table, may make a change to a position of start of a column (e.g., a tab stop), make a change to the width of a column, globally adjust a position of a column (e.g., a global tab stop), and the like. Those skilled in the art will appreciate that other alternative internal manipulations of the identified lines may occur to allow manipulation of the data as one unit of data. Processing then ends.

Figure 6:
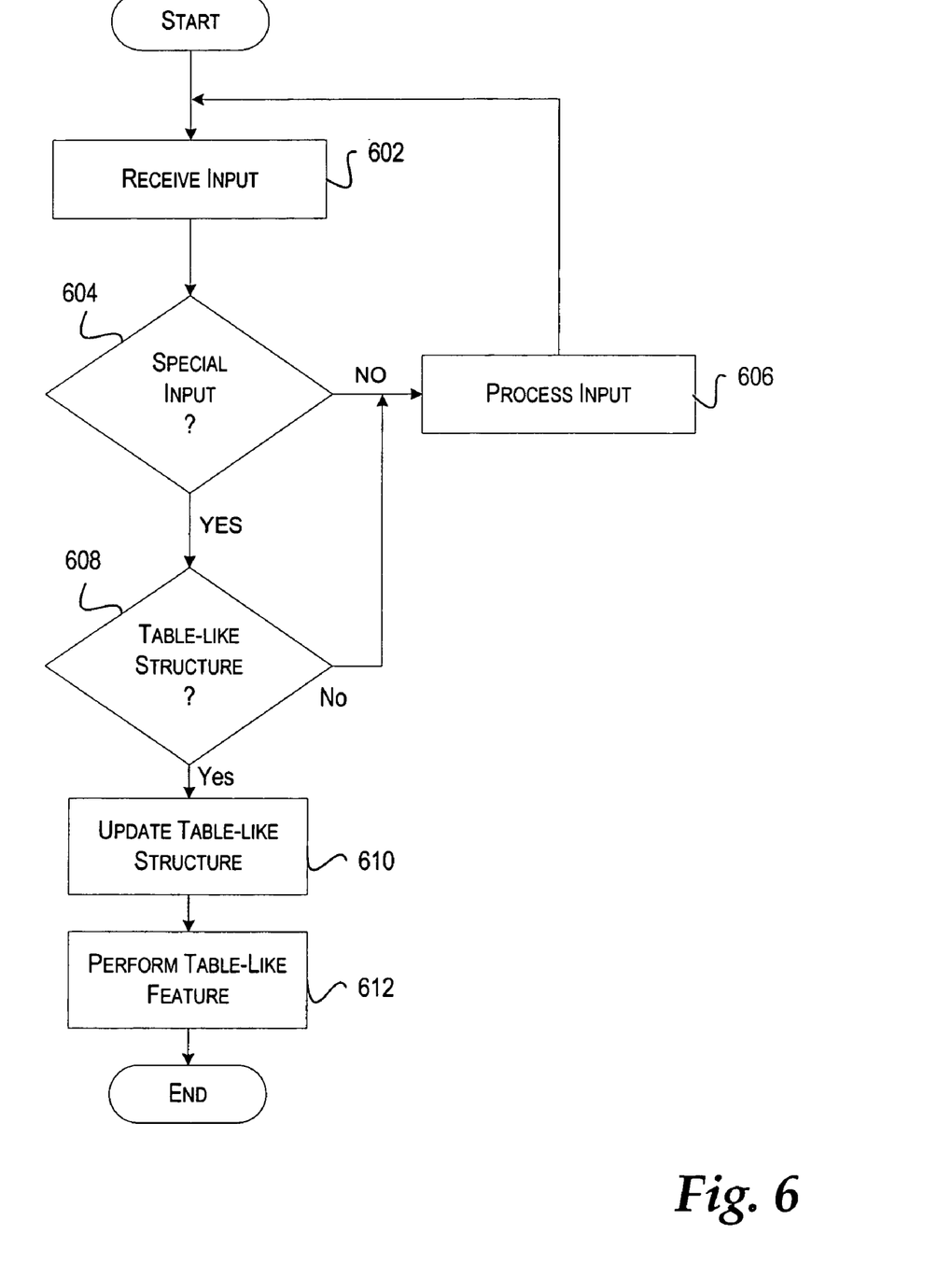
FIG. 6 is a flow diagram generally illustrating a process for manipulating a plurality of lines as a unit of data without using additional windows.

FIG. 6 is a flow diagram generally illustrating a process for manipulating the plurality of lines as a unit of data without using additional windows. In contrast to the embodiment illustrated in FIG. 5, this embodiment modifies the internal representation of the lines as the user is inputting them. The process begins where the data processing application is executing and a user is creating a document. Processing continues at block 602.

At block 602, an input is received from the user. These inputs may be received from multiple input devices, such as a keyboard and a mouse. Processing continues at decision block 604.

At decision block 604, a determination is made whether the input is a special input as determined by the data processing application. Special inputs may include a tab, a hover with a mouse, and the like. If the input is not designated as a special input, the process continues at block 606.

At block 606, the input is processed in a conventional manner by the data processing application. The process then loops back to block 602 and proceeds as described above.

Returning to decision block 604, if the input is determined to correspond to a special input, processing continues to decision block 608. At decision block 608, a determination is made whether the special input is associated with a table-like structure, such as indicating that a table-like structure is being organized. In one embodiment, this decision is based on whether a tab follows data that has been input on the same line. If the special input is not associated with a table-like structure, processing loops back to block 606 where the input is processed and proceeds as described above. However, if the special input is associated with a table-like structure, processing continues at block 610.

At block 610, the table-like structure (i.e., pseudo-table) is updated. This includes creating a new data unit for the pseudo-table, repositioning columns, modifying column widths, sorting the contents, and the like. As recalled from above, each cell in the pseudo-table has a corresponding data unit. In one embodiment, the data unit is an object that maintains useful information about the data unit, such as its position. In another embodiment, each data unit may further have a handle associated with it. The handle allows a user to directly manipulate the data unit without resorting to another window. For example, the user may conveniently delete one of the data units by selecting the handle associated with the data unit and dragging the handle away from the rest of the pseudo-table. This action removes the data unit from the pseudo-table and causes other data units to re-position accordingly. Once this underlying pseudo-table is created and updated, the data processing application manipulates the data as one data unit. The process then ends.

As one will note, in one embodiment, once a pseudo-table is defined, processing performed at block 606 may involve manipulation of the data within the pseudo-table using conventional methods. Having described both FIGS. 5 and 6, one will note that FIG. 5 may be viewed as one illustrative example of the process illustrated in FIG. 6. FIG. 5 illustrates a case in which the special input is defined as hovering over a line of data. At decision block 608, the determination of whether the special input is associated with a table-like structure is determined by scanning continuous lines for horizontally aligned data. The table-like feature is then performed at block 612. Optionally, at block 610, as discussed above, the contiguous lines may be internally modified to allow the manipulation of the data in a table-like manner. Thus, it will be appreciated that these and other variations of the system and method enabled by the present invention simplifies interaction with the data processing application, thereby improving the user's experience.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for manipulating data in a word processing application, comprising:
   detecting an input from an input device;
   determining whether the input indicates the manipulation of data in a tabular manner, wherein determining whether the input indicates the manipulation of data in a tabular manner includes scanning at least one contiguous line in a word processing document to determine whether the at least one contiguous line is a horizontally aligned line, the horizontally aligned line being horizontally aligned with a line of data associated with the input, wherein scanning is performed until a non-aligned line is identified, the non-aligned line having a different horizontal alignment than the line of data; and
   upon determining that the input indicates the manipulation of data in a tabular manner, formatting the data into a tabular structure without requiring pre-configuration of a tabular structure and displaying the tabular structure.

2. The computer-implemented method of claim 1, wherein the input includes a signal in response to a cursor hovering over a line of data in the word processing document that is being displayed.

3. The computer-implemented method of claim 1, wherein scanning is performed in an upward direction from the line of data until a non-aligned line is identified, the non-aligned line having a different horizontal alignment than the line of data, the horizontally aligned lines and the line of data represent the tabular structure.

4. The computer-implemented method of claim 1, wherein scanning is performed in a downward direction from the line of data until a non-aligned line is identified, the non-aligned line having a different horizontal alignment than the line of data, the horizontally aligned lines and the line of data represent the tabular structure.

5. The computer-implemented method of claim 1, wherein the input includes a signal in response to a cursor that is hovering over the line of data, and wherein the tabular function includes reformatting content within a column in the tabular structure, the column corresponding to a location within the line of data at which the cursor is hovering.

6. The computer-implemented method of claim 1, wherein the input includes a signal in response to a cursor that is hovering over the line of data, and wherein the tabular function includes adjusting a width of a column in the tabular structure, the column corresponding to a location with the line of data at which the cursor is hovering.

7. The computer-implemented method of claim 1, wherein the input includes a signal in response to depressing a tab key on a keyboard.

8. The computer-implemented method of claim 1, wherein determining whether the input indicates the manipulation of data in a tabular manner includes determining whether the input follows data on a current line of data in the word processing document.

9. The computer-implemented method of claim 1, further comprising creating a table to represent the tabular structure.

10. A computer-readable storage medium having computer executable instructions for manipulating data in a word processing application, the instructions comprising:
    receiving an input;
    determining whether the input is associated with a table, wherein determining whether the input is associated with the table includes scanning at least one contiguous line in a word processing document to determine whether the at least one contiguous line is a horizontally aligned line, the horizontally aligned line being horizontally aligned with a line of data associated with the input;
    upon determining that the input is associated with a table, determining whether the input indicated the manipulation of existing data in a tabular manner;
    updating a displayed table associated with data entered in the tabular manner when the input indicates manipulation of existing data in a tabular manner; and
    performing tabular features using the table without requiring pre-configuration of the table.

11. The computer-readable medium of claim 10, wherein updating the table includes adding another column of information to the table and dynamically repositioning existing columns of information on a display in order to accommodate the other column of information on the display.

12. The computer-readable medium of claim 11, wherein dynamically repositioning includes dividing an available line length by a number equal to the existing columns plus the other column and positioning the existing columns and the other column at equal intervals along the line.

13. The computer-readable medium of claim 12, wherein dynamically repositioning further includes adjusting the equal intervals based on a content length, the content length being associated with an amount of text in the existing column and in the other column.

14. The computer-readable medium of claim 10, wherein the data entered in the tabular manner includes a tabbed line.

15. A system for manipulating data, comprising:
    a processor; and
    a memory into which a plurality of instructions are loaded, the plurality of instructions performing a method comprising:
      detecting an input from an input device;
      determining whether the input indicates the manipulation of existing data in a tabular manner, wherein determining whether the input indicates the manipulation of existing data in a tabular manner includes scanning at least one contiguous line in a word processing document to determine whether the at least one contiguous line is a horizontally aligned line, the horizontally aligned line being horizontally aligned with a line of data associated with the input; and
      upon determining that the input indicates the manipulation of existing data in a tabular manner, formatting the data into a tabular structure without requiring pre-configuration of a tabular structure and display the tabular structure.

16. The system of claim 15, wherein the input includes a signal in response to a cursor that is hovering over the line of data, and wherein the tabular function includes reformatting content within a column in the tabular structure, the column corresponding to a location within the line of data at which the cursor is hovering.

17. The system of claim 15, wherein the input includes a signal in response to a cursor that is hovering aver the line of data, and wherein the tabular function includes adjusting a width of a column in the tabular structure, the column corresponding to a location with the line of data at which the cursor is hovering.

18. The system of claim 15, wherein the input includes a signal in response to depressing a tab key on a keyboard.

19. The system of claim 15, wherein determining whether the input indicates the manipulation of data in a tabular manner includes determining whether the input follows data on a current line of data in the document.

20. The system of claim 15, further comprising creating a table to represent the tabular structure, the table including one or more of the same functions of an expressly defined table.

* * * * *